United States Patent
Asuma (10) Patent No.: US 10,747,094 B2
(45) Date of Patent: Aug. 18, 2020

(54) PROJECTION DISPLAY DEVICE, METHOD OF CONTROLLING PROJECTION DISPLAY DEVICE, AND PROGRAM FOR CONTROLLING PROJECTION DISPLAY DEVICE

(71) Applicant: FUJIFILM Corporation, Tokyo (JP)

(72) Inventor: Nobuko Asuma, Saitama (JP)

(73) Assignee: FUJIFILM Coporation, Tokyo (JP)

(*) Notice: Subject to any disclaimer, the term of this patent is extended or adjusted under 35 U.S.C. 154(b) by 0 days.

(21) Appl. No.: 16/517,675

(22) Filed: Jul. 22, 2019

(65) Prior Publication Data
US 2019/0339605 A1  Nov. 7, 2019

Related U.S. Application Data

(63) Continuation of application No. PCT/JP2018/000316, filed on Jan. 10, 2018.

(30) Foreign Application Priority Data

Feb. 23, 2017 (JP) .................. 2017-032260

(51) Int. Cl.
*G03B 21/20* (2006.01)
*H04N 9/31* (2006.01)
*G03B 21/16* (2006.01)

(52) U.S. Cl.
CPC ......... *G03B 21/2053* (2013.01); *G03B 21/16* (2013.01); *G03B 21/206* (2013.01); *H04N 9/3182* (2013.01); *H04N 9/3194* (2013.01)

(58) Field of Classification Search
CPC ............ G03B 21/2053; G03B 21/2033; G03B 21/208; H04N 9/3155; H04N 9/3161; H04N 9/3194; H04N 9/3182
See application file for complete search history.

(56) References Cited

U.S. PATENT DOCUMENTS 7,926,956 B2   4/2011  Oka
2011/0261326 A1*  10/2011  Wang ............. G03B 21/28
                                                353/31

FOREIGN PATENT DOCUMENTS

JP     2003131322    5/2003
JP     2004226631    8/2004
(Continued)

OTHER PUBLICATIONS

"International Search Report (Form PCT/ISA/210) of PCT/JP2018/000316," dated Mar. 27, 2018, with English translation thereof, pp. 1-5.

(Continued)

*Primary Examiner* — Ryan D Howard
(74) *Attorney, Agent, or Firm* — JCIPRNET (57) ABSTRACT

A HUD 100 includes a R light source 12*r*, a G light source 12*g*, and a B light source 12*b*; collimating lenses 13*r*, 13*g*, and 13*b* that are arranged forwardly of the light sources; fly-eye lenses 16 and 17 that are arranged side by side on an optical path of light that exits from the collimating lenses; a light modulation element 20 that, based on image information, performs spatial modulation on light that has passed through the fly-eye lenses; a projection optical system 50 that projects image light onto a projection surface 7, the image light acquired by the spatial modulation by the light modulation element; photodetection elements PD1 and PD2 that are fixed to a portion of the fly-eye lens 16; and an image light control unit 40B that controls a brightness distribution of the image light based on a brightness of light detected by each of the photodetection elements.

20 Claims, 6 Drawing Sheets

(56) References Cited

FOREIGN PATENT DOCUMENTS

| JP | 2004317800 | 11/2004 |
| JP | 2008003270 | 1/2008 |
| JP | 2008089837 | 4/2008 |
| JP | 2009037160 | 2/2009 |
| JP | 2010175644 | 8/2010 |
| JP | 2012078682 | 4/2012 |

OTHER PUBLICATIONS

"International Preliminary Report on Patentability (Form PCT/IPEA/409) of PCT/JP2018/000316," completed on Dec. 13, 2018, with English translation thereof, pp. 1-19.

* cited by examiner

PROJECTION DISPLAY DEVICE, METHOD OF CONTROLLING PROJECTION DISPLAY DEVICE, AND PROGRAM FOR CONTROLLING PROJECTION DISPLAY DEVICE

CROSS-REFERENCE TO RELATED APPLICATIONS

This application is a Continuation of PCT International Application No. PCT/JP2018/000316 filed on Jan. 10, 2018, which claims priority under 35 U.S.C. § 119(a) to Japanese Patent Application No. 2017-032260 filed on Feb. 23, 2017. Each of the above application(s) is hereby expressly incorporated by reference, in its entirety, into the present application.

BACKGROUND OF THE INVENTION

1. Field of the Invention

The present invention relates to a projection display device, a method of controlling a projection display device, and a non-transitory computer readable recording medium storing a program for controlling a projection display device.

2. Description of the Related Art

As light sources of a projector, LEDs (light emitting diodes) or semiconductor lasers are used instead of conventional cold cathode fluorescent lamp or ultrahigh pressure mercury lamps, to increase a color reproduction range.

Unlike cold cathode fluorescent lamps or ultrahigh pressure mercury lamps, semiconductor light sources, such as LEDs or semiconductor lasers, have a characteristic in which the emission spectrum is concentrated in a relatively narrow wavelength range, and are often used as light sources in a combination of three primary colors, R (red), G (green), and B (blue).

It is known that the light emission amounts of such semiconductor light sources change due to temperature changes in the surrounding environment, temperature changes in the light sources themselves, or drive conditions (such as drive current amounts). As a result of the light emission amounts changing, the brightness of each primary color changes individually and the brightness and the chromaticity of an entire displayed image change.

Accordingly, by detecting light rays emitted from the semiconductor light sources by, for example, a photodiode and controlling outputs of the light sources, the brightness and the chromaticity of the entire displayed image are adjusted (refer to JP2008-003270A).

JP2008-003270A describes that a photodetection unit which detects the light amounts from the semiconductor light sources is arranged between a pair of fly-eye lenses and describes a HUD (head-up display) that controls the light amounts of the semiconductor light sources for the respective colors, R, G, and B, based on the light amounts that are detected by the photodetection unit.

JP2012-078682A describes a projector using a light source composed of a high pressure mercury lamp or a metal halide lamp. In this projector, whether the light source has become stable is determined by an output of a photodetection unit arranged on an optical path, and a standby image differing from an input image is displayed until the light source becomes stable.

JP2009-037160A describes a projector that measures the brightness of light on an optical path from a light source to a projection lens and that controls an output of the light source based on the measured brightness, to prevent a reduction in a display brightness caused by an elapse of time.

SUMMARY OF THE INVENTION

A light distribution (a range in which light spreads with a light emission point as a center) of a semiconductor light source is narrow. Therefore, when a semiconductor light source is used as a light source of a projection display device, such as a projector or a HUD, an optical system for spreading in a wide range light emitted from the semiconductor light source is arranged on an optical path between the semiconductor light source and a light modulation element (also referred to as "forwardly of the semiconductor light source") so that the light emitted from the semiconductor light source is incident upon a wide range of an illumination surface of the light modulation element.

For example, designing of such an optical system and designing for the distance between the optical system and the light modulation element are performed by considering a design value of the light distribution of the semiconductor light source. However, variations exist in the light distribution of the semiconductor light source. Even the optical system arranged forwardly of the semiconductor light source may have variations in its characteristics.

Consequently, the intensity distribution of the light that is incident upon the illumination surface of the light modulation element may not be in accordance with the design due to the aforementioned variations. When a deviation occurs in this intensity distribution, this causes a reduction in image quality, such as brightness unevenness and color unevenness, of an image that is displayed.

The devices described in JP2008-003270A, JP2012-078682A, and JP2009-037160A detect the light amounts of light sources by one photodetection unit and performs feedback control of the light sources. Therefore, the intensity distribution of light that is incident upon the light modulation element cannot be measured. Consequently, a reduction in the image quality of the displayed image caused by the variations in the intensity distribution cannot be prevented.

The present invention has been made in view of the above circumstances, and an object thereof is to provide a projection display device, a method of controlling a projection display device, and a non-transitory computer readable recording medium storing a program for controlling a projection display device, which are capable of preventing a reduction in image quality of a displayed image caused by variations in a light distribution of a semiconductor light source.

A projection display device of the present invention includes a semiconductor light source; a first lens that is arranged forwardly of the semiconductor light source and that collimates a light distribution of the semiconductor light source; a second lens and a third lens that are two lenses arranged side by side on an optical path of light that exits from the first lens, and that each include a lens array arranged two-dimensionally in a lens surface perpendicular to a direction in which the two lenses are arranged side by side; a light modulation element that, based on image information, performs spatial modulation on light that has passed through the second lens and the third lens; a projection optical system that projects image light onto a projection surface, the image light acquired by the spatial modulation by the light modulation element; a plurality of photodetection elements that, at different positions in a direction parallel to the lens surface, detect light incident upon the second lens or the third lens; and an image light control unit that controls a brightness distribution of the image light based on a brightness of the light detected by each of the plurality of photodetection elements; and a light source control unit that controls an output of the semiconductor light source based on information about the light detected by one of the plurality of photodetection elements that is arranged at a position closest to a center of the second lens or a center of the third lens.

A method of controlling a projection display device of the present invention is provided. The projection display device includes a semiconductor light source; a first lens that is arranged forwardly of the semiconductor light source and that collimates a light distribution of the semiconductor light source; a second lens and a third lens that are two lenses arranged side by side on an optical path of light that exits from the first lens, and that each include a lens array arranged two-dimensionally in a lens surface perpendicular to a direction in which the two lenses are arranged side by side; a light modulation element that, based on image information, performs spatial modulation on light that has passed through the second lens and the third lens; a projection optical system that projects image light onto a projection surface, the image light acquired by the spatial modulation by the light modulation element; and a plurality of photodetection elements that, at different positions in a direction parallel to the lens surface, detect light incident upon the second lens or the third lens. The method includes an image light control step of controlling a brightness distribution of the image light based on a brightness of the light detected by each of the plurality of photodetection elements; and a light source control step of controlling an output of the semiconductor light source based on information about the light detected by one of the plurality of photodetection elements that is arranged at a position closest to a center of the second lens or a center of the third lens.

A non-transitory computer readable recording medium storing a program for controlling a projection display device of the present invention is provided. The projection display device includes a semiconductor light source; a first lens that is arranged forwardly of the semiconductor light source and that collimates a light distribution of the semiconductor light source; a second lens and a third lens that are two lenses arranged side by side on an optical path of light that exits from the first lens, and that each include a lens array arranged two-dimensionally in a lens surface perpendicular to a direction in which the two lenses are arranged side by side; a light modulation element that, based on image information, performs spatial modulation on light that has passed through the second lens and the third lens; a projection optical system that projects image light onto a projection surface, the image light acquired by the spatial modulation by the light modulation element; and a plurality of photodetection elements that, at different positions in a direction parallel to the lens surface, detect light incident upon the second lens or the third lens. The program causes a computer to execute an image light control step of controlling a brightness distribution of the image light based on a brightness of the light detected by each of the plurality of photodetection elements; and a light source control step of controlling an output of the semiconductor light source based on information about the light detected by one of the plurality of photodetection elements that is arranged at a position closest to a center of the second lens or a center of the third lens.

According to the present invention, it is possible to provide a projection display device, a method of controlling a projection display device, and a non-transitory computer readable recording medium storing a program for controlling a projection display device, which are capable of preventing a reduction in image quality of a displayed image caused by variations in a light distribution of a semiconductor light source.

DESCRIPTION OF THE PREFERRED EMBODIMENTS

Figure 1:
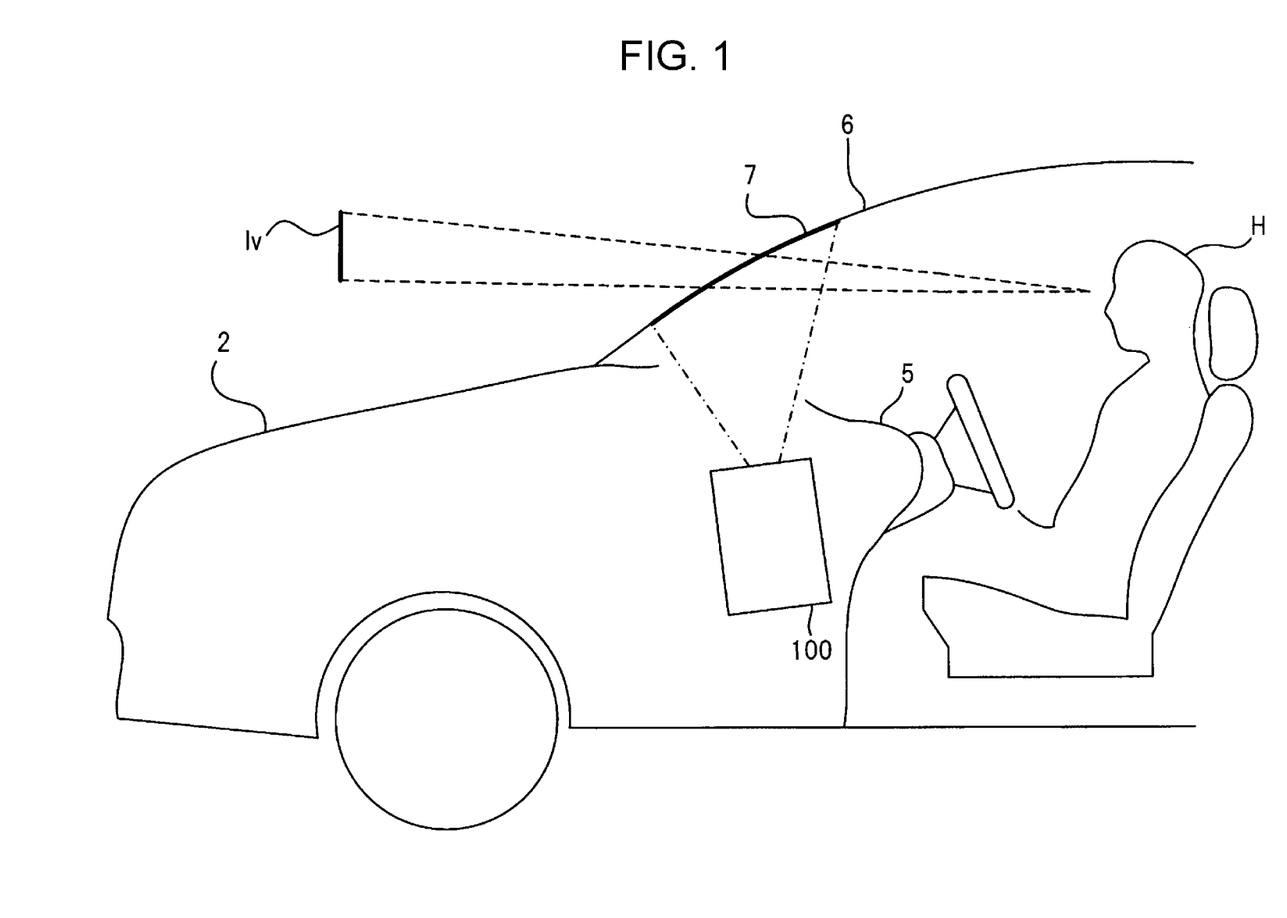
FIG. 1 is a schematic view illustrating a general configuration of an automobile 2 in which a HUD 100, which is an embodiment of a projection display device of the present invention, is mounted.

FIG. 1 is a schematic view illustrating a general configuration of an automobile 2 in which a HUD 100, which is an embodiment of a projection display device of the present invention, is mounted. The HUD 100 can be mounted and used in a vehicle other than an automobile, such as a train, a heavy machine, a construction machine, an aircraft, a ship, or an agricultural machine.

The HUD 100 is built in a dashboard 5 of the automobile 2, and projects image light on a projection surface 7 that is provided at a windshield 6 of the automobile 2 and that is processed to reflect light. By reflected light of the image light, a virtual image Iv based on the image light is displayed beyond and forwardly of the windshield 6.

By viewing the virtual image Iv displayed forwardly of the windshield 6, a driver H can recognize information, such as a picture or a character or the like, for supporting operations of the automobile 2.

Figure 2:
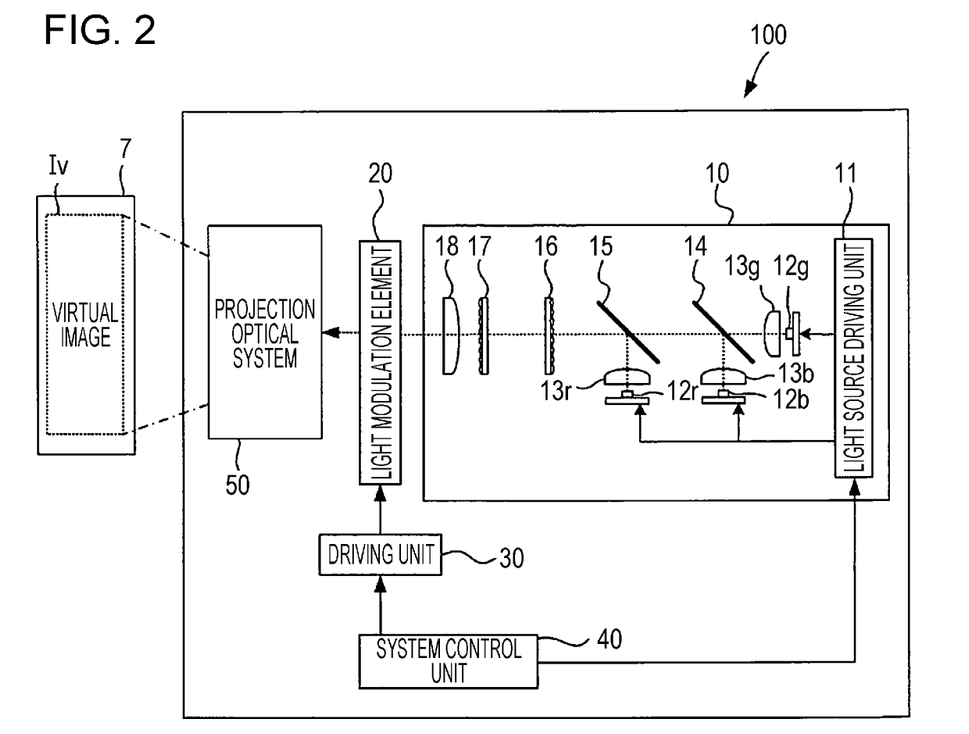
FIG. 2 is a schematic view illustrating an internal configuration of the HUD 100 illustrated in FIG. 1.

FIG. 2 is a schematic view illustrating an internal configuration of the HUD 100 illustrated in FIG. 1.

The HUD 100 includes a light source unit 10, a light modulation element 20, a driving unit 30 that drives the light modulation element 20, a system control unit 40 that performs overall control of the whole, and a projection optical system 50.

The light source unit 10 has a light source driving unit 11, a R light source 12r that is a semiconductor light source that emits R light, a G light source 12g that is a semiconductor light source that emits G light, a B light source 12b that is a semiconductor light source that emits B light, a collimating lens 13r that constitutes a first lens, a collimating lens 13g that constitutes a first lens, a collimating lens 13b that constitutes a first lens, a half mirror 14, a half mirror 15, a fly-eye lens 16 that constitutes a second lens, a fly-eye lens 17 that constitutes a third lens, and a convex lens 18.

The R light source 12r, the G light source 12g, and the B light source 12b are each composed of, for example, a semiconductor laser or an LED. In the present embodiment, although the light source unit 10 includes three semiconductor light sources, the number of semiconductor light sources that the light source unit 10 includes may be one, two, or four or more.

The collimating lens 13r is arranged forwardly of the R light source 12r. The collimating lens 13r has the function of collimating light emitted from the R light source 12r in a direction parallel to an optical axis of the collimating lens 13r.

Although, in the example of FIG. 2, the collimating lens 13r is composed of one lens, the collimating lens 13r may be composed by combining a plurality of lenses. The collimating lens 13r may have any configuration as long as the configuration allows the light emitted from the R light source 12r to be collimated, and is not limited to a convex lens.

The collimating lens 13b is arranged forwardly of the B light source 12b. The collimating lens 13b has the function of collimating light emitted from the B light source 12b in a direction parallel to an optical axis of the collimating lens 13b.

Although, in the example of FIG. 2, the collimating lens 13b is composed of one lens, the collimating lens 13b may be composed by combining a plurality of lenses. The collimating lens 13b may have any configuration as long as the configuration allows light emitted from the B light source 12b to be collimated, and is not limited to a convex lens.

The collimating lens 13g is arranged forwardly of the G light source 12g. The collimating lens 13g has the function of collimating light emitted from the G light source 12g in a direction parallel to an optical axis of the collimating lens 13g. The optical axis of the collimating lens 13g is orthogonal to the optical axis of the collimating lens 13r and the optical axis of the collimating lens 13b.

Although, in the example of FIG. 2, the collimating lens 13g is composed of one lens, the collimating lens 13g may be composed by combining a plurality of lenses. The collimating lens 13g may have any configuration as long as the configuration allows light emitted from the G light source 12g to be collimated, and is not limited to a convex lens.

The half mirror 14 is arranged at a position where the optical axis of the collimating lens 13g and the optical axis of the collimating lens 13b intersect each other and obliquely at an angle of 45° with respect to each of the optical axes. The half mirror 14 transmits the G light collimated by the collimating lens 13g.

The half mirror 14 reflects the B light collimated by the collimating lens 13b in an optical axis direction of the collimating lens 13g.

The half mirror 15 is arranged at a position where the optical axis of the collimating lens 13g and the optical axis of the collimating lens 13r intersect each other and obliquely at an angle of 45 degrees (°) with respect to each of the optical axes. The half mirror 15 transmits the G light transmitted through the half mirror 14 and the B light reflected by the half mirror 14.

The half mirror 15 reflects the R light collimated by the collimating lens 13r in the optical axis direction of the collimating lens 13g. Within a range of ±5 degrees, "orthogonal", "perpendicular", "parallel", or a specific angle (for example, 45°) can be regarded as "orthogonal", "perpendicular", "parallel", or the specific angle.

Based on a command from the system control unit 40, the light source driving unit 11 performs field sequential driving in which a light emission timing and a light emission output of each of the R light source 12r, the G light source 12g, and the B light source 12b are controlled.

Specifically, the light source driving unit 11 performs control in which the light emission amounts of the respective R light source 12r, G light source 12g, and B light source 12b are set to predetermined light-emission-amount patterns and light rays from the R light source 12r, the G light source 12g, and the B light source 12b are successively emitted in accordance with the light-emission-amount patterns.

The fly-eye lens 16 and the fly-eye lens 17 are arranged side by side on an optical path of the G light transmitted through the half mirror 15, an optical path of the B light transmitted through the half mirror 15, or an optical path of the R light reflected by the half mirror 15.

The fly-eye lens 16 includes a lens array composed of a plurality of convex-shaped lenses arranged two-dimensionally in a lens surface perpendicular to a direction in which the fly-eye lens 16 and the fly-eye lens 17 are arranged side by side (in the example of FIG. 2, in the optical axis direction of the collimating lens 13g).

The fly-eye lens 16 is arranged so that top portions of the convex-shaped lenses face a side of the half mirror 15.

The fly-eye lens 17 includes a lens array composed of a plurality of convex-shaped lenses arranged two-dimensionally in a lens surface perpendicular to the direction in which the fly-eye lens 16 and the fly-eye lens 17 are arranged side by side.

The fly-eye lens 17 is arranged so that top portions of the convex-shaped lenses face a side opposite to a side of the fly-eye lens 16.

The fly-eye lens 16 and the fly-eye lens 17 have the function of making uniform the illuminance of light that illuminates the light modulation element 20 by generating a plurality of light source images from the light rays transmitted through or reflected by the half mirror 15 and superimposing the plurality of light source images at an illumination surface of the light modulation element 20 by the convex lens 18.

The convex lens 18 is an imaging lens that condenses light beams that have passed through the fly-eye lens 17 at the illumination surface of the light modulation element 20.

The light modulation element 20 spatially modulates, based on image information, each of the R light, G light, and B light condensed by the convex lens 18 of the light source unit 10 and illuminating the illumination surface, and causes the spatially modulated light rays (R image light, G image light, and B image light) to exit to the projection optical system 50.

As the light modulation element 20, for example, LCOS (liquid crystal on silicon), a DMD (digital micromirror device), a MEMS (micro-electro-mechanical systems) element, or a liquid crystal display element can be used.

The driving unit 30 drives the light modulation element 20 based on the image information input from the system control unit 40 to cause the light rays in accordance with the image information (R image light, G image light, and B image light) to exit to the projection optical system 50.

The image information includes, for example, information about characters and icons for performing route guidance, character information indicating the travel speed, and information for giving a warning.

The projection optical system 50 is an optical system for projecting the image light rays (R image light, G image light, and B image light), spatially modulated by the light modulation element 20, onto the projection surface 7. The projection optical system 50 includes, for example, a diffuser, a lens, a mirror, or a magnifying glass.

The projection optical system 50 is optically designed so that an image based on the image light rays projected on the projection surface 7 is made visible to a driver as a virtual image at a location situated forwardly of the projection surface 7.

The projection optical system 50 may be optically designed so that an image based on the image light rays projected on the projection surface 7 is made visible to a driver as a real image on the projection surface 7.

The system control unit 40 performs overall control of the whole HUD 100, and its hardware structures are various processors that perform processing by executing programs including a control program.

The various processors include, for example, a CPU (central processing unit) which is a general-purpose processor that executes programs and performs various processing operations, a programmable logic device (PLD), such as a FPGA (field programmable gate array), which is a processor whose circuit configuration can be changed after manufacturing, or a dedicated electrical circuit, such as an ASIC (application specific integrated circuit), which is a processor having a circuit configuration specially designed for executing a specific processing operation.

More specifically, the structures of the various processors are electrical circuits in which circuit elements, such as semiconductor elements, are combined.

The system control unit 40 may be composed of one of the various processors, or may be composed of a combination of two or more processors of the same type or of different types (for example, a combination of a plurality of FPGAs or a combination of a CPU and a FPGA).

Figure 3:
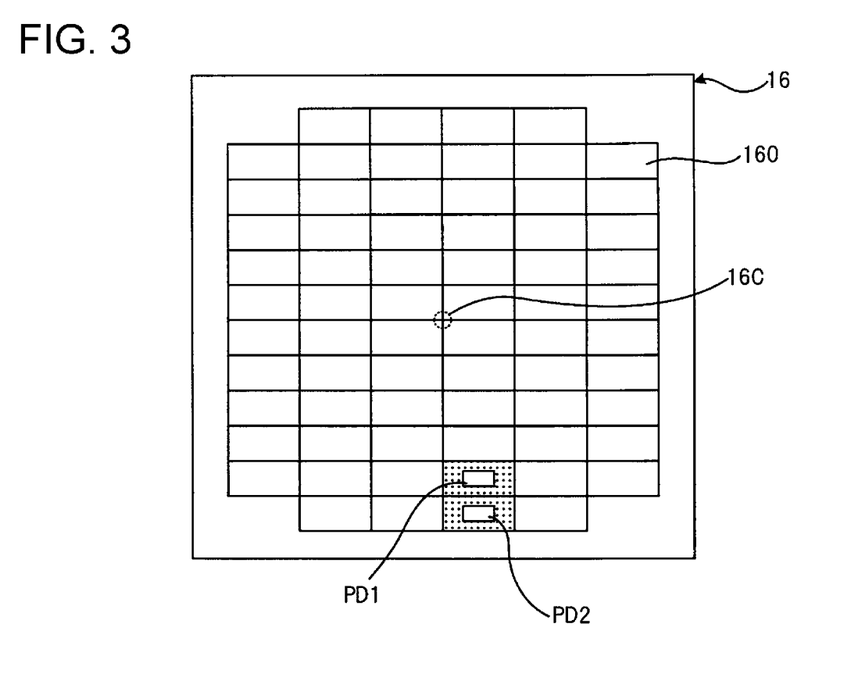
FIG. 3 is a front view schematically illustrating a state in which a fly-eye lens 16 in a light source unit 10 of the HUD 100 illustrated in FIG. 2 is seen from a side of a half mirror 15.

FIG. 3 is a front view schematically illustrating a state in which the fly-eye lens 16 in the light source unit 10 of the HUD 100 illustrated in FIG. 2 is seen from the side of the half mirror 15.

The fly-eye lens 16 is composed of the plurality of convex-shaped lenses 160 (in the example of FIG. 3, 68 pieces) arranged two-dimensionally in the lens surface perpendicular to the optical axis of the collimating lens 13g.

A photodetection element PD1 and a photodetection element PD2 are fixed to a corresponding one of the two convex-shaped lenses 160 among the convex-shaped lenses 160 that constitute the fly-eye lens 16 (hatched convex-shaped lenses 160 in the figure).

The photodetection element PD1 and the photodetection element PD2 are each fixed with, for example, an adhesive to a top portion of a convex portion of a light-incident side of the convex-shaped lens 160 or a light-exiting side surface.

The photodetection element PD1 and the photodetection element PD2 each receive the R light, the G light, or the B light incident upon the fly-eye lens 16, and outputs an electrical signal that is in accordance with a received light amount (information about brightness).

The photodetection element PD1 and the photodetection element PD2 are composed of, for example, a circuit including a photoelectric conversion element, such as a phototransistor or a photodiode, having sensitivity to a wavelength range including R, G, and B.

The photodetection element PD1 and the photodetection element PD2 detect light at positions that differ in a direction parallel to a plane in which the plurality of convex-shaped lenses 160 are arranged.

The photodetection element PD1 and the photodetection element PD2 are provided for measuring the intensity distribution of the R light, the G light, or the B light incident upon the fly-eye lens 16 (the degree of spreading of light from the center 16C of the fly-eye lens 16 in the direction along the plane in which the plurality of convex-shaped lenses 160 are arranged).

In order to measure the intensity distribution with good precision, as illustrated in FIG. 3, it is desirable that the distance from the center 16C of the fly-eye lens 16 to the photodetection element PD1 and the distance from the center 16C of the fly-eye lens 16 to the photodetection element PD2 differ from each other. In the example of FIG. 3, the photodetection element PD1 is arranged at a position that is closer than the photodetection element PD2 to the center 16C.

In the HUD 100, in order for the intensity distribution of the R light that illuminates the light modulation element 20 to be in a desired state, for example, the optical characteristics of the collimating lens 13r and an optical path length of the R light up to the fly-eye lens 16 are determined with respect to design light distribution characteristics of the R light source 12r.

Similarly, in order for the intensity distribution of the G light that illuminates the light modulation element 20 to be in a desired state, for example, the optical characteristics of the collimating lens 13g and an optical path length of the G light up to the fly-eye lens 16 are determined with respect to design light distribution characteristics of the G light source 12g.

Similarly, in order for the intensity distribution of the B light that illuminates the light modulation element 20 to be in a desired state, for example, the optical characteristics of the collimating lens 13b and an optical path length of the B light up to the fly-eye lens 16 are determined with respect to design light distribution characteristics of the B light source 12b.

Here, as mentioned above, the light distribution characteristics of the respective R light source 12r, G light source 12g, and B light source 12b vary with respect to design values.

The optical characteristics of the respective collimating lenses 13r, 13g, and 13b may also vary with respect to design values.

As in HUDs for vehicles, when the possibility of use under a high temperature environment is high, the possibility of slight changes in the light distribution characteristics of the semiconductor light sources and the optical characteristics of the collimating lenses due to the environmental temperature is also thinkable.

Accordingly, when the light distribution characteristics of the semiconductor light sources and the optical characteristics of the collimating lenses deviate from the design values, the aforementioned intensity distributions deviate from the desired states. The photodetection elements PD1 and PD2 are provided in the light source unit 10 for the purpose of detecting the deviations.

The intensity distribution of each colored light ray mentioned above is defined by the position of each convex-shaped lens 160 and the brightness of light incident upon this position.

Figure 4:
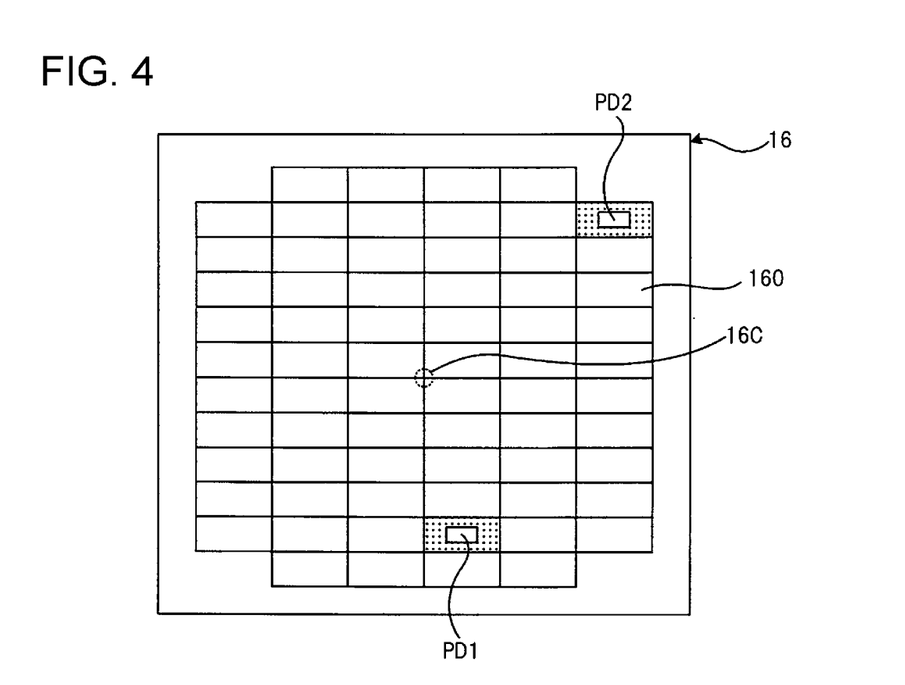
FIG. 4 is a diagram illustrating a modification of an arrangement of photodetection elements PD1 and PD2.

FIG. 4 is a diagram illustrating a modification of the arrangement of the photodetection elements PD1 and PD2, and is a front view schematically illustrating a state in which the fly-eye lens 16 in the light source unit 10 of the HUD 100 illustrated in FIG. 2 is seen from the side of the half mirror 15.

In the example illustrated in FIG. 4, the position of the photodetection element PD2 is changed from that in the example of FIG. 3.

In the arrangement example illustrated in FIG. 4, the distance from the center 16C to the photodetection element PD1 and the distance from the center 16C to the photodetection element PD2 differ from each other, and the photodetection element PD1 is arranged at a position that is closer to the center 16C. Even in this arrangement example, it is possible to measure the intensity distributions of the respective R light, G light, and B light.

The arrangement of the photodetection element PD1 and the photodetection element PD2 is not limited to the arrangements illustrated in FIGS. 3 and 4, and the photodetection elements PD1 and PD2 can be set at any positions in accordance with design intensity distributions.

Figure 5:
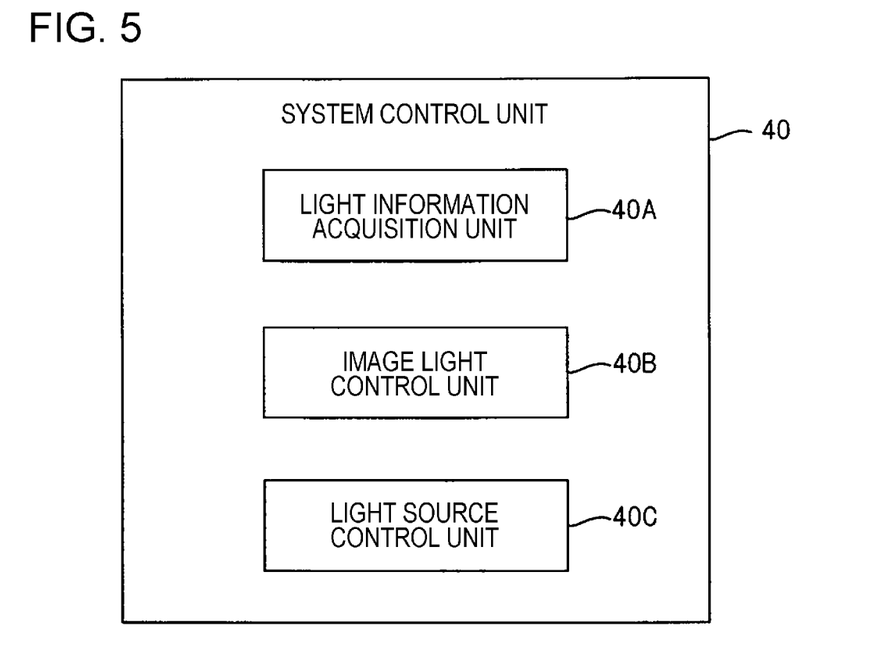
FIG. 5 is a functional block diagram of a system control unit 40 in the HUD 100 illustrated in FIG. 2.

FIG. 5 is a functional block diagram of the system control unit 40 in the HUD 100 illustrated in FIG. 2.

As a result of a processor executing a control program stored in ROM, the system control unit 40 functions as a light information acquisition unit 40A, an image light control unit 40B, and a light source control unit 40C.

The light information acquisition unit 40A acquires from the photodetection elements PD1 and PD2 and stores in RAM (random access memory) each of a first brightness of the R light detected by the photodetection element PD1 (first R measurement brightness), a first brightness of the G light detected by the photodetection element PD1 (first G measurement brightness), a first brightness of the B light detected by the photodetection element PD1 (first B measurement brightness), a second brightness of the R light detected by the photodetection element PD2 (second R measurement brightness), a second brightness of the G light detected by the photodetection element PD2 (second G measurement brightness), and a second brightness of the B light detected by the photodetection element PD2 (second B measurement brightness).

The ROM (read only memory) built in the system control unit 40 previously stores a design R-light brightness at an arrangement position of the photodetection element PD1 when a predetermined test image is to be displayed (first R design brightness) and a design R-light brightness at an arrangement position of the photodetection element PD2 (second R design brightness).

The aforementioned ROM previously stores a design G-light brightness at the arrangement position of the photodetection element PD1 when the aforementioned test image is to be displayed (first G design brightness) and a design G-light brightness at the arrangement position of the photodetection element PD2 (second G design brightness).

The aforementioned ROM previously stores a design B-light brightness at the arrangement position of the photodetection element PD1 when the aforementioned test image is to be displayed (first B design brightness) and a design B-light brightness at the arrangement position of the photodetection element PD2 (second B design brightness).

Based on a first R difference value acquired by subtracting the first R design brightness from the first R measurement brightness and a second R difference value acquired by subtracting the second R design brightness from the second R measurement brightness, the image light control unit 40B controls a brightness distribution of the R image light acquired by spatially modulating the R light by the light modulation element 20.

Based on a first G difference value acquired by subtracting the first G design brightness from the first G measurement brightness and a second G difference value acquired by subtracting the second G design brightness from the second G measurement brightness, the image light control unit 40B controls a brightness distribution of the G image light acquired by spatially modulating the G light by the light modulation element 20.

Based on a first B difference value acquired by subtracting the first B design brightness from the first B measurement brightness and a second B difference value acquired by subtracting the second B design brightness from the second B measurement brightness, the image light control unit 40B controls a brightness distribution of the B image light acquired by spatially modulating the B light by the light modulation element 20.

Figure 6:
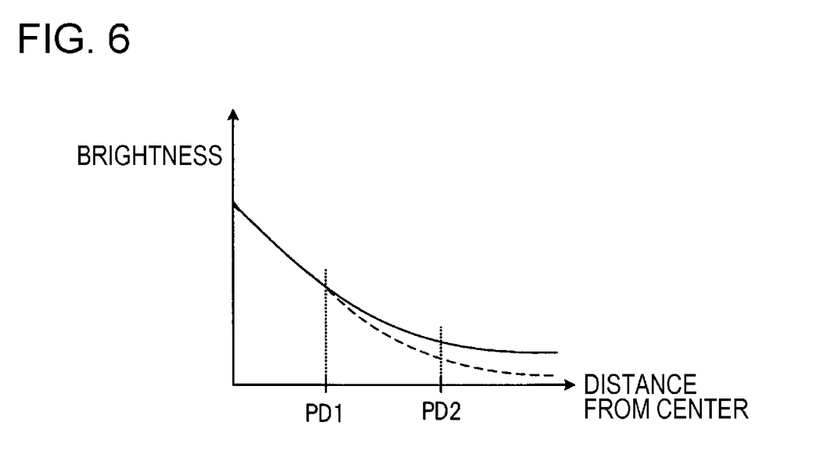
FIG. 6 is a diagram illustrating an example of an intensity distribution of light in a direction that is downward from a center 16C in FIG. 3.
Figure 7:
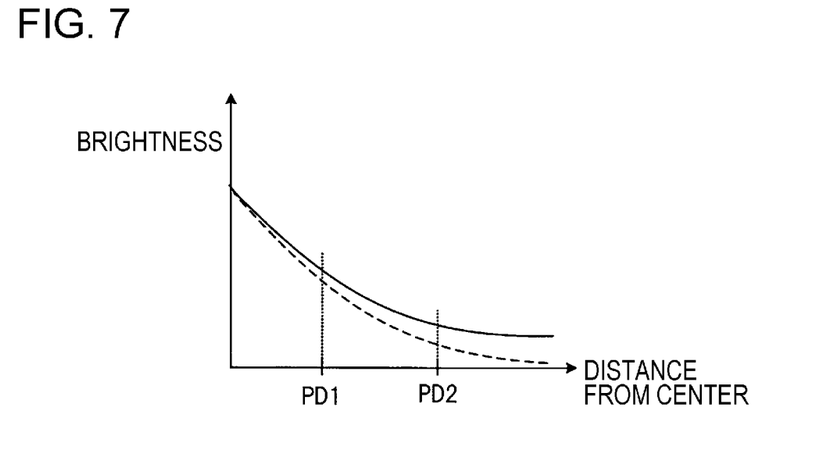
FIG. 7 is a diagram illustrating an example of an intensity distribution of light in the direction that is downward from the center 16C in FIG. 3.

FIGS. 6 and 7 are each a diagram illustrating an example of an intensity distribution of light in a direction towards an edge side of the lens surface from the center 16C in FIG. 3 (for example, a direction in which the PD1 or the PD2 is arranged; here, also called a "downward" direction). In FIGS. 6 and 7, the horizontal axis indicates the distance from the center 16C in the downward direction from the center 16C, and the vertical axis indicates the brightness of light incident upon the convex-shaped lenses 160 at respective distances.

In FIGS. 6 and 7, the graph illustrated by a solid line indicates the design intensity distribution, and the graph illustrated by a broken line indicates the actually measured intensity distribution.

As illustrated in FIGS. 6 and 7, the intensity distribution of light incident upon the fly-eye lens 16 is such that the brightness near the center 16C is high, and is reduced with increasing distance from the center 16C.

Here, when the actually measured intensity distribution of light up to a location that is far away from the center is narrower than the design intensity distribution, as illustrated in FIGS. 6 and 7, a difference between the brightness that is detected by the photodetection element PD1 and the design brightness occurs, or a difference between the brightness that is detected by the photodetection element PD2 and the design brightness occurs.

Therefore, the brightnesses at surrounding portions of the image light rays acquired by the spatial modulation by the light modulation element 20 are in a reduced state.

That is, since if these brightness differences are known, how much the brightnesses are reduced with respect to the design values at the surrounding portions of the image light rays after the spatial modulation can be known, it is possible to perform control that prevents a reduction in the brightnesses.

The surrounding portion of the R image light is an area where, when the intensity distribution of the R light is narrower than the design value, the brightness is greatly influenced, and can be previously determined in terms of design.

The surrounding portion of the G image light is an area where, when the intensity distribution of the G light is narrower than the design value, the brightness is greatly influenced, and can be previously determined in terms of design.

The surrounding portion of the B image light is an area where, when the intensity distribution of the B light is narrower than the design value, the brightness is greatly influenced, and can be previously determined in terms of design.

The ROM built in the system control unit 40 stores previously set correction values of brightness control values of the surrounding portion of the R image light by making the correction values correspond to combinations of the first R difference value and the second R difference value.

When the first R difference value and the second R difference value are each a threshold value or less, since the intensity distribution of the R light is substantially in accordance with the design, zero is stored as the correction value.

The ROM built in the system control unit 40 stores previously set correction values of brightness control values of the surrounding portion of the G image light by making the correction values correspond to combinations of the first G difference value and the second G difference value.

When the first G difference value and the second G difference value are each a threshold value or less, since the intensity distribution of the G light is substantially in accordance with the design, zero is stored as the correction value.

The ROM built in the system control unit 40 stores previously set correction values of brightness control values of the surrounding portion of the B image light by making the correction values correspond to combinations of the first B difference value and the second B difference value.

When the first B difference value and the second B difference value are each a threshold value or less, since the intensity distribution of the B light is substantially in accordance with the design, zero is stored as the correction value.

The image light control unit 40B reads out the correction value corresponding to the first R difference value and the second R difference value from the ROM, adds the correction value to the previously determined brightness control value of the surrounding portion of the R image light (value when the intensity distribution of the R light is in accordance with the design), and updates the brightness control value.

By updating the brightness control value in this way, when an image is to be subsequently displayed, the brightness of the surrounding portion of the R image light is controlled to an increased state based on the updated brightness control value.

The image light control unit 40B reads out the correction value corresponding to the first G difference value and the second G difference value from the ROM, adds the correction value to the previously determined brightness control value of the surrounding portion of the G image light (value when the intensity distribution of the G light is in accordance with the design), and updates the brightness control value.

By updating the brightness control value in this way, when the image is to be subsequently displayed, the brightness of the surrounding portion of the G image light is controlled to an increased state based on the updated brightness control value.

The image light control unit 40B reads out the correction value corresponding to the first B difference value and the second B difference value from the ROM, adds the correction value to the previously determined brightness control value of the surrounding portion of the B image light (value when the intensity distribution of the B light is in accordance with the design), and updates the brightness control value.

By updating the brightness control value in this way, when the image is to be subsequently displayed, the brightness of the surrounding portion of the B image light is controlled to an increased state based on the updated brightness control value.

As methods of controlling the brightnesses of image light rays, for example, a first method and a second method below exist.

First Method

In this method, it is assumed that, as the light modulation element 20, a DMD (digital micromirror device) that spatially modulates light by a plurality of movable mirrors arranged two-dimensionally is used.

In the light modulation element 20 using the DMD, by controlling, for example, a pulse width of a driving signal for turning on and off the movable mirrors and by adjusting the length of an on time, it is possible to change the brightness of light that is projected towards the projection surface 7 from the movable mirrors.

The image light control unit 40B can increase the brightnesses of the surrounding portions of the image light rays by, for example, uniformly making long the length of the on time of the movable mirrors corresponding to the surrounding portions of the aforementioned image light rays. In this method, the on time of the movable mirrors is the aforementioned brightness control value.

Second Method

In this method, it is assumed that, as the light modulation element 20, a reflective-type liquid crystal display element is used.

In the light modulation element 20 using the reflective-type liquid crystal display element, by adjusting the transmissivity of liquid crystals that constitute pixels of the liquid crystal display element, it is possible to change the brightness of light that is projected towards the projection surface 7 from the pixels.

The image light control unit 40B can increase the brightnesses of the surrounding portions of the image light rays by, for example, uniformly making large the transmissivity of the pixels corresponding to the surrounding portions of the aforementioned image light rays. In this method, the transmissivity of the pixels is the aforementioned brightness control value.

The light source control unit 40C monitors the first R measurement brightness, the first G measurement brightness, and the first B measurement brightness, and controls the light emission outputs of the respective R light source 12r, G light source 12g, and B light source 12b so that the first R measurement brightness, the first G measurement brightness, and the first B measurement brightness become target brightnesses.

Figure 8:
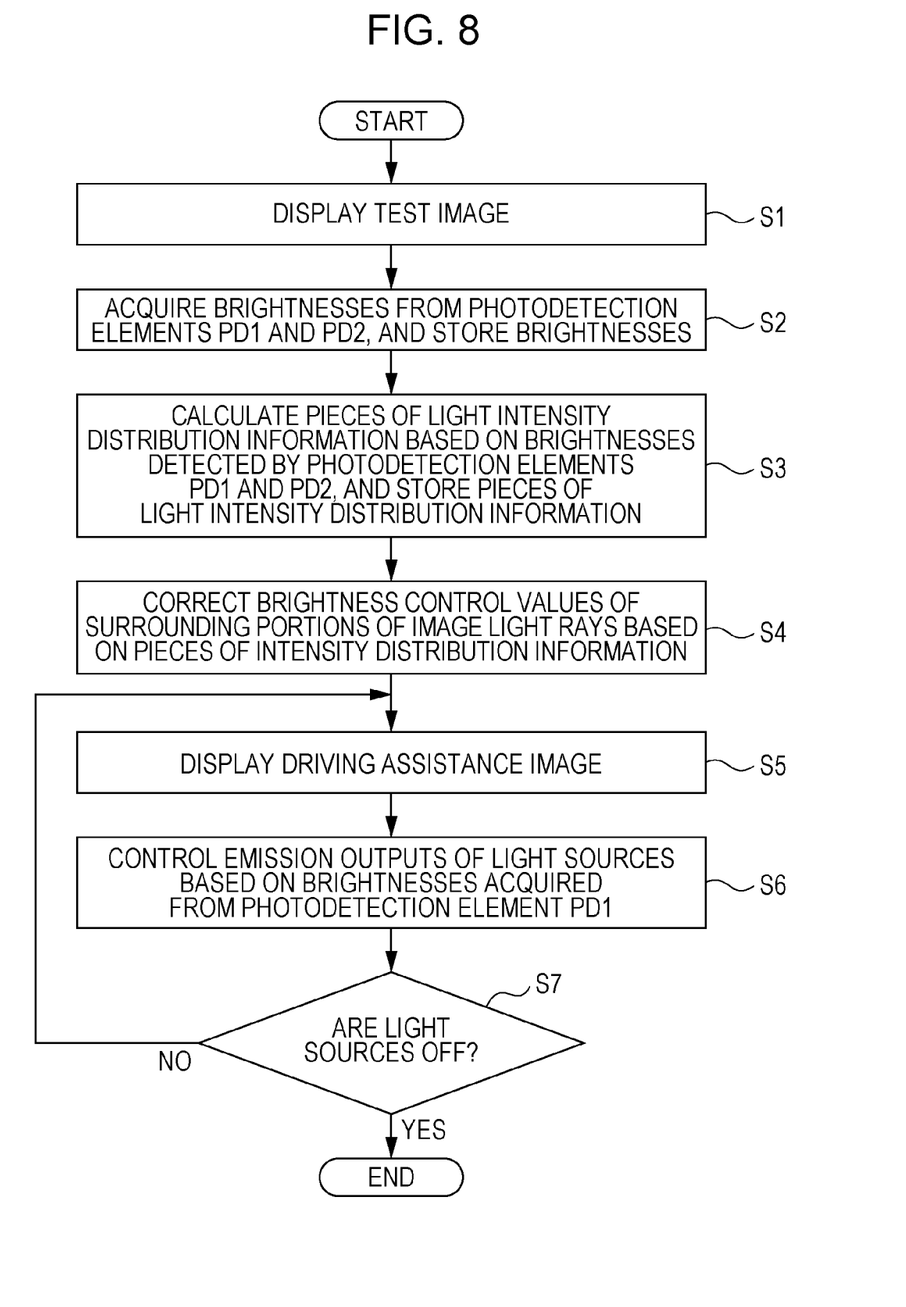
FIG. 8 is a flowchart for describing operations of the HUD 100 illustrated in FIG. 1.

FIG. 8 is a flowchart for describing operations of the HUD 100 illustrated in FIG. 1.

When the HUD 100 starts, the system control unit 40 inputs image information for displaying a test image to the driving unit 30. Further, the system control unit 40 controls the light source driving unit 11 and causes the R light source 12r, the G light source 12g, and the B light source 12b to emit light rays in this order with light emission outputs at previously determined initial settings. The control causes the test image to be displayed as a virtual image (Step S1).

The light information acquisition unit 40A acquires the first R measurement brightness and the second R measurement brightness detected by the photodetection elements PD1 and PD2 during the light emission of the R light source 12r for displaying the test image, and stores the first R measurement brightness and the second R measurement brightness in the RAM (Step S2).

The light information acquisition unit 40A acquires the first G measurement brightness and the second G measurement brightness detected by the photodetection elements PD1 and PD2 during the light emission of the G light source 12g for displaying the test image, and stores the first G measurement brightness and the second G measurement brightness in the RAM (Step S2).

The light information acquisition unit 40A acquires the first B measurement brightness and the second B measurement brightness detected by the photodetection elements PD1 and PD2 during the light emission of the B light source 12b for displaying the test image, and stores the first B measurement brightness and the second B measurement brightness in the RAM (Step S2).

Next, the image light control unit 40B calculates, as pieces of light intensity distribution information, the first R difference value, the second R difference value, the first G difference value, the second G difference value, the first B difference value, and the second B difference value based on pieces of brightness information stored in the RAM, and stores these difference values in the RAM (Step S3).

Next, the image light control unit 40B reads out from the ROM the correction value corresponding to a combination of the first R difference value and the second R difference value, adds this correction value to the brightness control value of the surrounding portion of the R image light, and updates the brightness control value of the surrounding portion of the R image light (Step S4).

The image light control unit 40B reads out from the ROM the correction value corresponding to a combination of the first G difference value and the second G difference value, adds this correction value to the brightness control value of the surrounding portion of the G image light, and updates the brightness control value of the surrounding portion of the G image light (Step S4).

The image light control unit 40B reads out from the ROM the correction value corresponding to a combination of the first B difference value and the second B difference value, adds this correction value to the brightness control value of the surrounding portion of the B image light, and updates the brightness control value of the surrounding portion of the B image light (Step S4).

When the processing of Step S4 ends, the system control unit 40 inputs image information for performing driving assistance to the driving unit 30, controls the light source driving unit 11, and causes the R light source 12r, the G light source 12g, and the B light source 12b to emit light rays in this order with light emission outputs at predetermined initial settings. The control causes a driving assistance image to be displayed as a virtual image (Step S5).

The light source control unit 40C acquires the R measurement brightness detected by the photodetection element PD1 during the light emission of the R light source 12r for displaying the driving assistance image.

The light source control unit 40C acquires the G measurement brightness detected by the photodetection element PD1 during the light emission of the G light source 12g for displaying the driving assistance image.

The light source control unit 40C acquires the B measurement brightness detected by the photodetection element PD1 during the light emission of the B light source 12b for displaying the driving assistance image.

The light source control unit 40C controls the light emission outputs of the respective R light source 12r, G light source 12g, and B light source 12b so that these three measurement brightnesses become respective target values (Step S6).

After Step S6, if a light-source off operation is performed (Step S7: NO), the processing returns to Step S5, whereas, if a light-source off operation is performed (Step S7: YES), the processing ends.

As described above, according to the HUD 100, even if the intensity distributions of light that is incident upon the fly-eye lens 16 deviate from the design values, the brightness control values of the surrounding portions of the image light rays are updated to brightness control values that correct the deviations at the time of start-up.

Therefore, it is possible to suppress brightness unevenness and color unevenness of the displayed image caused by the aforementioned deviations.

According to the HUD 100, of the photodetection elements PD1 and PD2 that are used to measure the light intensity distributions, the photodetection element PD1 is used to perform feedback control of the light sources even during display of a normal image, which is an image other than a test image.

Therefore, even if the light source outputs change due to, for example, temperature, it is possible to prevent a reduction in the quality of the displayed image caused by this change.

In the operation example illustrated in FIG. 8, although the brightness control values of the surrounding portions of the image light rays are corrected each time the HUD 100 is started, it is not limited thereto.

For example, a configuration may be one that corrects the brightness control values of the surrounding portions of the image light rays if, after starting the HUD 100 and correcting the brightness control values once, a previously determined condition is satisfied.

The previously determined condition is, for example, a condition in which an elapsed time from when the HUD 100 has started (continuous use time) exceeds a threshold value.

When the continuous use time of the HUD 100 is long, the temperature of a light-source surrounding portion of the light source unit 10 is increased. Due to the increase in the temperature, the characteristics of the collimating lenses 13r, 13g, and 13b change due to, for example, expansion, as a result of which the intensity distributions of light that is incident upon the fly-eye lens 16 may change from when the HUD 100 starts.

Accordingly, when the continuous use time is long, by correcting the brightness control values of the surrounding portions of the image light rays, it is possible to prevent a reduction in the quality of the displayed image.

Here, although the temperature of the light source unit 10 is estimated by the continuous use time of the HUD 100, as long as a configuration is one in which a temperature sensor is added to the vicinity of the semiconductor light sources of the HUD 100, the temperature of the light source unit 10 may be directly detected by the temperature sensor.

That is, the condition in which the temperature that is detected by the temperature sensor has exceeded a threshold value may be the aforementioned previously determined condition.

The image light control unit 40B may perform correction processing in each of a case in which the HUD 100 has started, a case in which the continuous use time of the HUD 100 has exceeded the threshold value, and a case in which the temperature of the temperature sensor has exceeded the threshold value.

Instead of performing the correction processing in the case in which the HUD 100 has started, the image light control unit 40B may perform the correction processing only in the case in which the continuous use time of the HUD 100 has exceeded the threshold value.

Instead of performing the correction processing in the case in which the HUD 100 has started, the image light control unit 40B may perform the correction processing in each of the cases in which the continuous use time of the HUD 100 has exceeded the threshold value and in which the temperature of the temperature sensor has exceeded the threshold value.

Instead of performing the correction processing in the case in which the HUD 100 has started, the image light control unit 40B may perform the correction processing only in the case in which the temperature of the temperature sensor has exceeded the threshold value.

Figure 9:
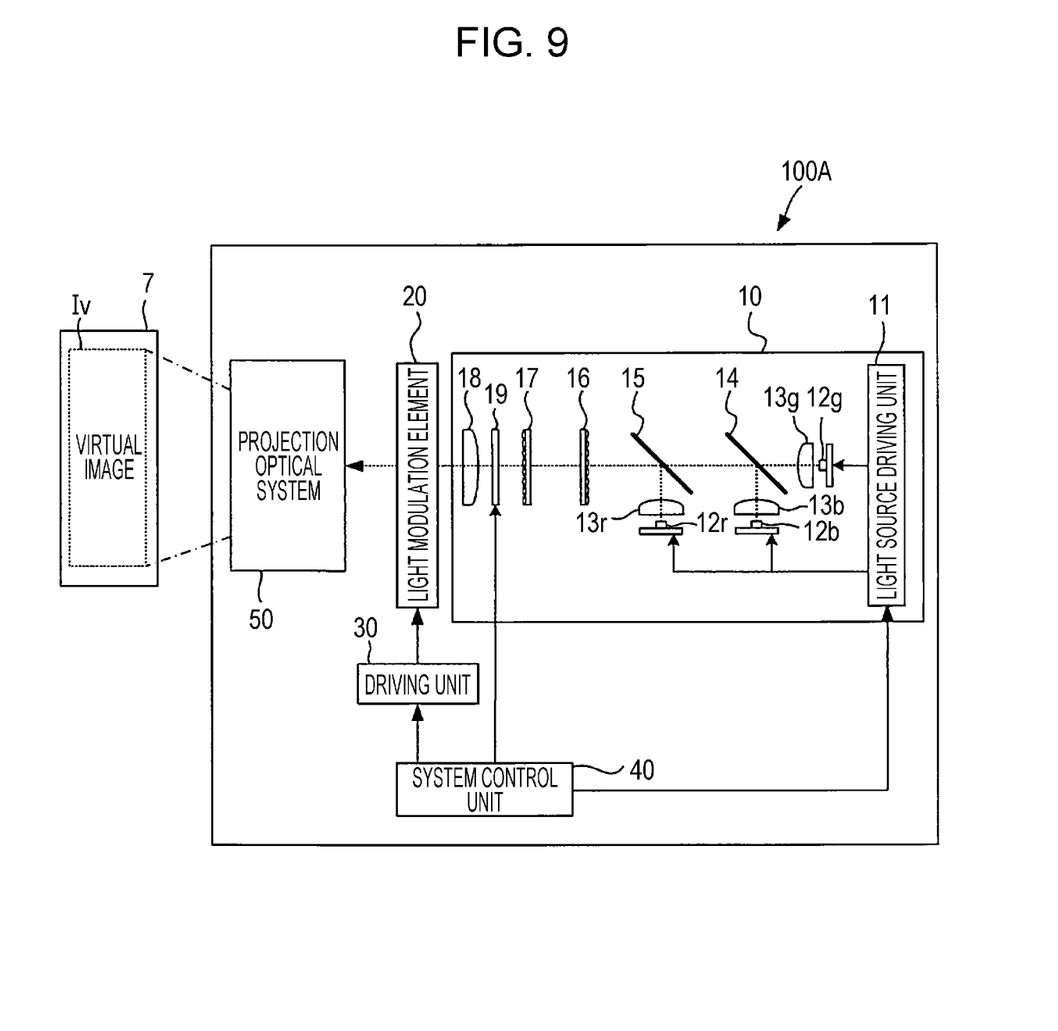
FIG. 9 is a schematic view illustrating an internal configuration of a HUD 100A, which is a modification of the HUD 100 illustrated in FIG. 1.

FIG. 9 is a schematic view illustrating an internal configuration of a HUD 100A, which is a modification of the HUD 100 illustrated in FIG. 1.

The HUD 100A has the same configurations as the HUD 100, except that an optical member 19 that is electrically controlled by the system control unit 40 is added to the light source unit 10. In FIG. 9, the same symbols are given to the configurations that are same as those in FIG. 2, and descriptions thereof are omitted.

The optical member 19 is arranged between the fly-eye lens 17 and the convex lens 18, and has a plurality of light transmission regions arranged two-dimensionally on a surface parallel to the lens surface perpendicular to the direction in which the fly-eye lens 16 and the fly-eye lens 17 are arranged side by side, the transmissivity of each of the plurality of light transmission regions being electrically controlled by the system control unit 40.

As the optical member 19, for example, a see-through type liquid crystal display element having the aforementioned light transmission regions as pixels is used.

In the HUD 100A, with the transmissivities of the light transmission regions of the optical member 19 that correspond to the surrounding portion of the R image light as the aforementioned brightness control values, the image light control unit 40B controls the brightness of the surrounding portion of the R image light by correcting the brightness control values.

With the transmissivities of the light transmission regions of the optical member 19 that correspond to the surrounding portion of the G image light as the aforementioned brightness control values, the image light control unit 40B controls the brightness of the surrounding portion of the G image light by correcting the brightness control values.

With the transmissivities of the light transmission regions of the optical member 19 that correspond to the surrounding portion of the B image light as the aforementioned brightness control values, the image light control unit 40B controls the brightness of the surrounding portion of the B image light by correcting the brightness control values.

In this way, by changing the transmissivities of the light transmission regions of the optical member 19 provided separately from the light modulation element 20, it is possible to control the brightnesses of the surrounding portions of the image light rays. According to this configuration, it is possible to prevent driving of the light modulation element 20 from becoming complicated.

Although, in the example of FIG. 9, the optical member 19 is arranged between the fly-eye lens 17 and the convex lens 18, the optical member 19 may be arranged at any position between the fly-eye lens 17 and the light modulation element 20.

In the description up to now, the photodetection elements PD1 and PD2 are fixed to some of the convex-shaped lenses 160 of the fly-eye lens 16.

As a modification thereof, a configuration may be one in which the photodetection elements PD1 and PD2 are fixed to some of the plurality of convex-shaped lenses that constitute the fly-eye lens 17.

In this configuration, the photodetection elements PD1 and PD2 are each fixed with, for example, an adhesive to a top portion of a light-exiting side of the convex-shaped lens of the fly-eye lens 17 or a light-incident side surface of the fly-eye lens 17.

A configuration may be one in which the photodetection elements PD1 and PD2 are each arranged at any location between the fly-eye lens 16 and the fly-eye lens 17.

As has been described above, according to the configuration in which the photodetection elements PD1 and PD2 are fixed to the fly-eye lens, a separate member for holding the photodetection elements PD1 and PD2 is not required. Therefore, it is possible to reduce manufacturing costs of the HUD 100 and the HUD 100A.

Although the HUD 100 and the HUD 100A are configured to have two photodetection elements, which are the photodetection element PD1 and the photodetection element PD2, the number of photodetection elements may be three or more.

Even in this case, by arranging three or more photodetection elements so that the distances from the center of the fly-eye lens 16 or the center of the fly-eye lens 17 all differ from each other, it is possible to measure the intensity distributions with good precision.

In the embodiment above, although a HUD is an example of the projection display device, the present invention is also similarly applicable to a projector.

HUDs that are mounted in vehicles are often placed in severe environments, such as being placed under high temperature environments and being steadily subjected to large vibrations, and the aforementioned deviations in the light intensity distributions are highly likely to occur. Therefore, the present invention is particularly effective in HUDs for vehicles.

As has been described above, the present description discloses the following matters.

(1) A projection display device including a semiconductor light source; a first lens that is arranged forwardly of the semiconductor light source and that collimates a light distribution of the semiconductor light source; a second lens and a third lens that are two lenses arranged side by side on an optical path of light that exits from the first lens, and that each include a lens array arranged two-dimensionally in a lens surface perpendicular to a direction in which the two lenses are arranged side by side; a light modulation element that, based on image information, performs spatial modulation on light that has passed through the second lens and the third lens; a projection optical system that projects image light onto a projection surface, the image light acquired by the spatial modulation by the light modulation element; a plurality of photodetection elements that, at different positions in a direction parallel to the lens surface, detect light incident upon the second lens or the third lens; and an image light control unit that controls a brightness distribution of the image light based on a brightness of the light detected by each of the plurality of photodetection elements.

(2) The projection display device according to (1), in which distances of the plurality of photodetection elements from a center of the second lens and a center of the third lens differ from each other.

(3) The projection display device according to (1) or (2), in which the image light control unit controls the brightness distribution of the image light in a case where the projection display device is started.

(4) The projection display device according to any one of (1) to (3), in which the image light control unit controls the brightness distribution of the image light in a case where an elapsed time from when the projection display device started exceeds a threshold value.

(5) The projection display device according to any one of (1) to (4), further including a temperature sensor, in which the image light control unit controls the brightness distribution of the image light in a case where a temperature that is detected by the temperature sensor exceeds a threshold value.

(6) The projection display device according to any one of (1) to (5), further including a light source control unit that controls an output of the semiconductor light source based on information about the light detected by one of the plurality of photodetection elements that is arranged at a position closest to a center of the second lens or a center of the third lens.

(7) The projection display device according to any one of (1) to (6), in which the plurality of photodetection elements are fixed to a portion of the lens array that constitutes the second lens or a portion of the lens array that constitutes the third lens.

(8) The projection display device according to any one of (1) to (7), in which the light modulation element performs the spatial modulation by a plurality of movable mirrors arranged two-dimensionally, and the image light control unit controls the brightness distribution of the image light by controlling a driving signal of the movable mirrors (9) The projection display device according to any one of (1) to (7), in which the light modulation element is a reflective-type liquid crystal display element, and the image light control unit controls the brightness distribution of the image light by controlling a transmission amount of light of a pixel of the liquid crystal display element.

(10) The projection display device according to any one of (1) to (7), further including an optical member that is arranged between one of the second lens and the third lens that is closer to the light modulation element and the light modulation element, and that has a plurality of light transmission regions arranged two-dimensionally at a surface parallel to the lens surface, a transmissivity of each of the plurality of light transmission regions being electrically controlled, in which the image light control unit controls the brightness distribution of the image light by controlling the transmissivities of the light transmission regions.

(11) A method of controlling a projection display device including a semiconductor light source; a first lens that is arranged forwardly of the semiconductor light source and that collimates a light distribution of the semiconductor light source; a second lens and a third lens that are two lenses arranged side by side on an optical path of light that exits from the first lens, and that each include a lens array arranged two-dimensionally in a lens surface perpendicular to a direction in which the two lenses are arranged side by side; a light modulation element that, based on image information, performs spatial modulation on light that has passed the second lens and the third lens; a projection optical system that projects image light onto a projection surface, the image light acquired by the spatial modulation by the light modulation element; and a plurality of photodetection elements that, at different positions in a direction parallel to the lens surface, detect light incident upon the second lens or the third lens, the method including an image light control step of controlling a brightness distribution of the image light based on a brightness of the light detected by each of the plurality of photodetection elements.

(12) The method of controlling a projection display device according to (11), in which distances of the plurality of photodetection elements from a center of the second lens and a center of the third lens differ from each other.

(13) The method of controlling a projection display device according to (11) or (12), in which, in the image light control step, the brightness distribution of the image light is controlled in a case where the projection display device is started.

(14) The method of controlling a projection display device according to any one of (11) to (13), in which, in the image light control step, the brightness distribution of the image light is controlled in a case where an elapsed time from when the projection display device started has exceeds a threshold value.

(15) The method of controlling a projection display device according to any one of (11) to (14), in which, in the image light control step, the brightness distribution of the image light is controlled in a case where a temperature that is detected by a temperature sensor that is mounted in the projection display device exceeds a threshold value.

(16) The method of controlling a projection display device according to any one of (11) to (15), further including a light source control step of controlling an output of the semiconductor light source based on information about the light detected by one of the plurality of photodetection elements that is arranged at a position closest to a center of the second lens or a center of the third lens.

(17) The method of controlling a projection display device according to any one of (11) to (16), in which the plurality of photodetection elements are fixed to a portion of the lens array that constitutes the second lens or a portion of the lens array that constitutes the third lens.

(18) The method of controlling a projection display device according to any one of (11) to (17), in which the light modulation element performs the spatial modulation by a plurality of movable mirrors arranged two-dimensionally, and in which, in the image light control step, the brightness distribution of the image light is controlled by controlling a driving signal of the movable mirrors.

(19) The method of controlling a projection display device according to any one of (11) to (17), in which the light modulation element is a reflective-type liquid crystal display element, and in which, in the image light control step, the brightness distribution of the image light is controlled by controlling a transmission amount of light of a pixel of the liquid crystal display element.

(20) The method of controlling a projection display device according to any one of (11) to (17), in which the projection display device further includes an optical member that is arranged between one of the second lens and the third lens that is closer to the light modulation element and the light modulation element, and that has a plurality of light transmission regions arranged two-dimensionally on a surface parallel to the lens surface, a transmissivity of each of the plurality of light transmission regions being electrically controlled, and in which, in the image light control step, the brightness distribution of the image light is controlled by controlling the transmissivities of the light transmission regions.

(21) A non-transitory computer readable recording medium storing a program for controlling a projection display device including a semiconductor light source; a first lens that is arranged forwardly of the semiconductor light source and that collimates a light distribution of the semiconductor light source; a second lens and a third lens that are two lenses arranged side by side on an optical path of light that exits from the first lens, and that each include a lens array arranged two-dimensionally in a lens surface perpendicular to a direction in which the two lenses are arranged side by side; a light modulation element that, based on image information, performs spatial modulation on light that has passed through the second lens and the third lens; a projection optical system that projects image light onto a projection surface, the image light acquired by the spatial modulation by the light modulation element; and a plurality of photodetection elements that, at different positions in a direction parallel to the lens surface, detect light incident upon the second lens or the third lens, the program causing a computer to execute an image light control step of controlling a brightness distribution of the image light based on a brightness of the light detected by each of the plurality of photodetection elements.

According to the present invention, it is possible to provide a high-quality projection display device that is capable of preventing a reduction in image quality of a displayed image caused by variations in a light distribution of a semiconductor light source.

REFERENCE SIGNS LIST

100 HUD
2 automobile
5 dashboard
6 windshield
7 projection surface
H driver
Iv virtual image
10 light source unit
11 light source driving unit
12r R light source
12g G light source
12b B light source
13r collimating lens (first lens)
13g collimating lens (first lens)
13b collimating lens (first lens)
14, 15 half mirror
16 fly-eye lens (second lens)
17 fly-eye lens (third lens)
160 convex-shaped lens
16C center
PD1, PD2 photodetection element
18 convex lens
20 light modulation element
30 driving unit
40 system control unit
50 projection optical system
40A light information acquisition unit
40B image light control unit
40C light source control unit
100A HUD
19 optical member

What is claimed is:

1. A projection display device comprising:
a semiconductor light source;
a first lens that is arranged forwardly of the semiconductor light source and that collimates a light distribution of the semiconductor light source;
a second lens and a third lens that are two lenses arranged side by side on an optical path of light that exits from the first lens, and that each include a lens array arranged two-dimensionally in a lens surface perpendicular to a direction in which the two lenses are arranged side by side;
a light modulation element that, based on image information, performs spatial modulation on light that has passed through the second lens and the third lens;
a projection optical system that projects image light onto a projection surface, the image light acquired by the spatial modulation by the light modulation element;
a plurality of photodetection elements that, at different positions in a direction parallel to the lens surface, detect light incident upon the second lens or the third lens; and
an image light control unit that controls a brightness distribution of the image light based on a brightness of the light detected by each of the plurality of photodetection elements; and
a light source control unit that controls an output of the semiconductor light source based on information about the light detected by one of the plurality of photodetection elements that is arranged at a position closest to a center of the second lens or a center of the third lens.

2. The projection display device according to claim 1, wherein distances of the plurality of photodetection elements from a center of the second lens and a center of the third lens differ from each other.

3. The projection display device according to claim 1, wherein the image light control unit controls the brightness distribution of the image light in a case where the projection display device is started.

4. The projection display device according to claim 2, wherein the image light control unit controls the brightness distribution of the image light in a case where the projection display device is started.

5. The projection display device according to claim 1, wherein the image light control unit controls the brightness distribution of the image light in a case where an elapsed time from when the projection display device started exceeds a threshold value.

6. The projection display device according to claim 1, further comprising:
a temperature sensor,
wherein the image light control unit controls the brightness distribution of the image light in a case where a temperature that is detected by the temperature sensor exceeds a threshold value.

7. The projection display device according to claim 1, wherein the plurality of photodetection elements are fixed to a portion of the lens array that constitutes the second lens or a portion of the lens array that constitutes the third lens.

8. The projection display device according to claim 1, wherein the light modulation element performs the spatial modulation by a plurality of movable mirrors arranged two-dimensionally, and
wherein the image light control unit controls the brightness distribution of the image light by controlling a driving signal of the movable mirrors.

9. The projection display device according to claim 1,
wherein the light modulation element is a reflective-type liquid crystal display element, and
wherein the image light control unit controls the brightness distribution of the image light by controlling a transmission amount of light of a pixel of the liquid crystal display element.

10. The projection display device according to claim 1, further comprising:
an optical member that is arranged between one of the second lens and the third lens that is closer to the light modulation element and the light modulation element, and that has a plurality of light transmission regions arranged two-dimensionally at a surface parallel to the lens surface, a transmissivity of each of the plurality of light transmission regions being electrically controlled,
wherein the image light control unit controls the brightness distribution of the image light by controlling the transmissivities of the light transmission regions.

11. A method of controlling a projection display device comprising a semiconductor light source; a first lens that is arranged forwardly of the semiconductor light source and that collimates a light distribution of the semiconductor light source; a second lens and a third lens that are two lenses arranged side by side on an optical path of light that exits from the first lens, and that each include a lens array arranged two-dimensionally in a lens surface perpendicular to a direction in which the two lenses are arranged side by side; a light modulation element that, based on image information, performs spatial modulation on light that has passed through the second lens and the third lens; a projection optical system that projects image light onto a projection surface, the image light acquired by the spatial modulation by the light modulation element; and a plurality of photodetection elements that, at different positions in a direction parallel to the lens surface, detect light incident upon the second lens or the third lens, the method comprising:
an image light control step of controlling a brightness distribution of the image light based on a brightness of the light detected by each of the plurality of photodetection elements; and
a light source control step of controlling an output of the semiconductor light source based on information about the light detected by one of the plurality of photodetection elements that is arranged at a position closest to a center of the second lens or a center of the third lens.

12. The method of controlling a projection display device according to claim 11,
wherein distances of the plurality of photodetection elements from a center of the second lens and a center of the third lens differ from each other.

13. The method of controlling a projection display device according to claim 11,
wherein, in the image light control step, the brightness distribution of the image light is controlled in a case where the projection display device is started.

14. The method of controlling a projection display device according to claim 11,
wherein, in the image light control step, the brightness distribution of the image light is controlled in a case where an elapsed time from when the projection display device started exceeds a threshold value.

15. The method of controlling a projection display device according to claim 11,
wherein, in the image light control step, the brightness distribution of the image light is controlled in a case where a temperature that is detected by a temperature sensor that is mounted in the projection display device exceeds a threshold value.

16. The method of controlling a projection display device according to claim 11,
wherein the plurality of photodetection elements are fixed to a portion of the lens array that constitutes the second lens or a portion of the lens array that constitutes the third lens.

17. The method of controlling a projection display device according to claim 11,
wherein the light modulation element performs the spatial modulation by a plurality of movable mirrors arranged two-dimensionally, and
wherein, in the image light control step, the brightness distribution of the image light is controlled by controlling a driving signal of the movable mirrors.

18. The method of controlling a projection display device according to claim 11,
wherein the light modulation element is a reflective-type liquid crystal display element, and
wherein, in the image light control step, the brightness distribution of the image light is controlled by controlling a transmission amount of light of a pixel of the liquid crystal display element.

19. The method of controlling a projection display device according to claim 11,
wherein the projection display device further comprises an optical member that is arranged between one of the second lens and the third lens that is closer to the light modulation element and the light modulation element, and that has a plurality of light transmission regions arranged two-dimensionally on a surface parallel to the lens surface, a transmissivity of each of the plurality of light transmission regions being electrically controlled, and
wherein, in the image light control step, the brightness distribution of the image light is controlled by controlling the transmissivities of the light transmission regions.

20. A non-transitory computer readable recording medium storing a program for controlling a projection display device comprising a semiconductor light source; a first lens that is arranged forwardly of the semiconductor light source and that collimates a light distribution of the semiconductor light source; a second lens and a third lens that are two lenses arranged side by side on an optical path of light that exits from the first lens, and that each include a lens array arranged two-dimensionally in a lens surface perpendicular to a direction in which the two lenses are arranged side by side; a light modulation element that, based on image information, performs spatial modulation on light that has passed through the second lens and the third lens; a projection optical system that projects image light onto a projection surface, the image light acquired by the spatial modulation by the light modulation element; and a plurality of photodetection elements that, at different positions in a direction parallel to the lens surface, detect light incident upon the second lens or the third lens, the program causing a computer to execute:
an image light control step of controlling a brightness distribution of the image light based on a brightness of the light detected by each of the plurality of photodetection elements; and
a light source control step of controlling an output of the semiconductor light source based on information about the light detected by one of the plurality of photodetection elements that is arranged at a position closest to a center of the second lens or a center of the third lens.

* * * * *